T. K. LEES.
Gas-Washing Machinery.
No. 8,851. Reissued Aug. 12, 1879.
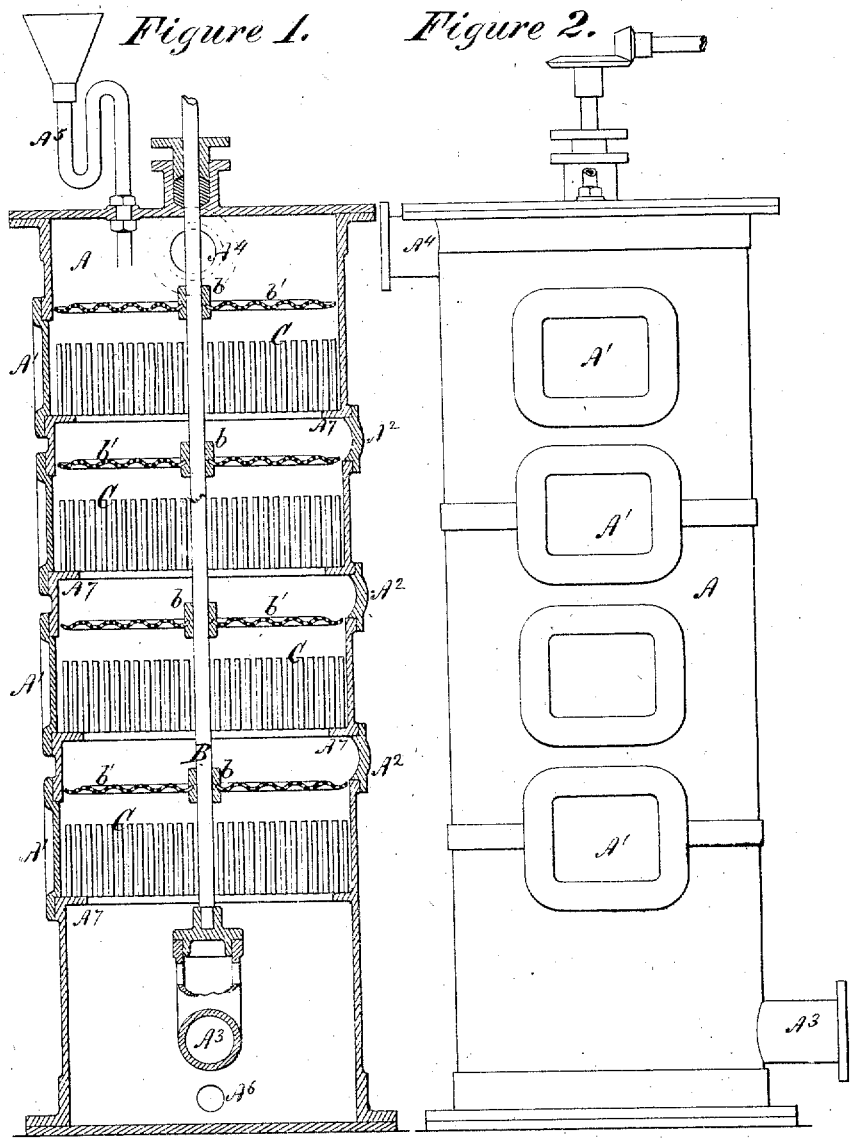
Witnesses:
Geo. H. Miatt
S. T. Sullivan
Inventor:
Thomas K. Lees
By his attorney
E. N. Dickerson Jr.

UNITED STATES PATENT OFFICE.

THOMAS K. LEES, OF BROOKLYN, NEW YORK.

IMPROVEMENT IN GAS-WASHING MACHINERY.

Specification forming part of Letters Patent No. 168,806, dated October 19, 1875; Reissue No. 8,851, dated August 12, 1879; application filed May 20, 1878.

*To all whom it may concern:*

Be it known that I, THOMAS K. LEES, of Brooklyn, Kings county, in the State of New York, have invented certain new and useful Improvements Relating to Scrubbers or Washers for Gas, of which the following is a specification.

It is desirable, in ridding the gas of its ammonia, to present a proper amount of water-surface, or of a wetted surface, to every particle of the gas, and to do this under conditions of great uniformity. My improved apparatus is intended for this purpose, and affords a great amount of wetted surface, with facilities for distributing water uniformly thereupon under conditions which allow the motion of the gas and the quantity of the water to be varied within wide limits.

The apparatus is very compact, is cheap of construction, and easy of access to every part for cleaning or repairs.

The accompanying drawings represent what I consider the best means of carrying out the invention.

Figure 1 is a central vertical section, and Fig. 2 is a side elevation.

Similar letters of reference indicate like parts in both the figures.

A is a gas-tight casing, of cast-iron, provided with suitable apertures, covered by bonnets $A^1$ and $A^2$, to allow access to the interior. Gas is allowed to enter through a nozzle, $A^3$, near the bottom, and to be discharged through a nozzle, $A^4$, near the top. In rising through the casing A the gas is scrubbed or washed by its contact with the wet surface, and the water trickling down therefrom conveys away the ammonia. Water is admitted from a stop-cock (not represented) through a trapped pipe or seal, $A^5$, at the top, and is discharged through a suitable trapped passage or seal, $A^6$, near the bottom.

B is a vertical shaft, mounted in the axial line of the casing A, and revolved by gearing turned slowly by connections from a steam-engine or other suitable power. Hubs *b*, fixed at intervals thereon, carry circular distributers *b'*, of sheet-iron or other suitable material, which are both perforated and corrugated. Corrugated distributers are preferable, though they may be made plain or in radial curves. The peripheries of the distributers *b'* run so near the interior of the casing A that the small quantity of gas flowing between will be about as effectually washed as that which passes up through the perforations. Internal flanges or shelves $A^7$, a little above each distributer *b'*, form supports for frames C, which are preferably bars of soft wood, rough sawed, and of little thickness and great depth, as shown. They may be armed with nails or other projections, (not represented,) to aid in holding each at a small distance from its neighbor on each side.

It is important to the highest success that the spaces between the grate-bars C be approximately uniform, so that the gas, in moving up through these spaces, shall be uniformly scrubbed.

When the apparatus is in use a current of gas moves upward through it, and a small quantity of water moves gradually in the opposite direction over all the surfaces. The constant moderate rotation of the shaft B and its attached distributer *b'* receive the water from the pipe $A^5$ on all parts of their upper surface, and, while the perforations distribute it, the corrugations aid to make the distribution practically uniform through every part of its revolution. The water falls in a shower upon the frames C immediately below, and, keeping all of its extended surface thoroughly wetted, falls upon the next distributer *b'*, and so on to the bottom of the apparatus.

The rotation of the distributers should not be so great as to throw the water with much force toward the periphery by centrifugal force. It is only desirable to keep the inner surface of the casing A wetted to about the same extent as the other parts.

The shaft B is stepped in a support near the bottom, which rests on the upturned end of the gas-induction pipe $A^3$, and the upper end turns in a stuffing-box, as represented. The power required is insignificant. The entire apparatus occupies but little room, and the action is unusually efficient and uniform.

The corrugations in the distributers *b'* not only aid in stiffening the distributers, but also aid in distributing the water evenly, as without them the water is liable to move too freely along the surface, and be all thrown to the periphery, or, in case of the least inclination of the distributers, all to one side.

Plane distributers may serve, but I prefer concentric corrugations. Radial corrugations or grooves may be of service to prevent the water from flowing too much to either side under any circumstances.

I claim as my invention—

1. The series of perforated distributers $b'$, mounted on the shaft B, revolving within a casing, A, in combination with gas-passages $A^3$ $A^4$ and water-passages $A^5$ $A^6$, as and for the purposes described.

2. A frame, C, in combination with the casing A, revolving water-distributers $b'$, and with gas-connections $A^3$ $A^4$ and water-connections $A^5$ $A^6$, as and for the purposes herein specified.

THOMAS K. LEES.

Witnesses:
S. F. SULLIVAN,
WM. J. SAWYER.